(12) United States Patent
Dhanasekaran et al.

(10) Patent No.: US 10,846,263 B2
(45) Date of Patent: Nov. 24, 2020

(54) SYSTEMS AND METHODS FOR IMPLEMENTING CONTENT AWARE FILE MANAGEMENT LABELING

(71) Applicant: MICROSOFT TECHNOLOGY LICENSING, LLC, Redmond, WA (US)

(72) Inventors: Kannan Dhanasekaran, Redmond, WA (US); Nakul Garg, Sammamish, MA (US); Krishna Kumar Parthasarathy, Redmond, WA (US); Dheepak Ramaswamy, Seattle, WA (US); Yu Li, Bellevue, WA (US); Martin Gagne, Woodinville, WA (US); Yonghua Yang, Sammamish, WA (US); Jinhao Li, Redmond, WA (US); Liming Chen, Redmond, WA (US); Mingquan Xue, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 258 days.

(21) Appl. No.: 15/852,223

(22) Filed: Dec. 22, 2017

(65) Prior Publication Data
US 2019/0095450 A1 Mar. 28, 2019

Related U.S. Application Data

(60) Provisional application No. 62/562,059, filed on Sep. 22, 2017.

(51) Int. Cl.
*G06F 16/11* (2019.01)
*G06F 16/16* (2019.01)

(52) U.S. Cl.
CPC .......... *G06F 16/122* (2019.01); *G06F 16/168* (2019.01)

(58) Field of Classification Search
CPC . G06F 17/30; G06F 7/30; G06F 17/22; G06F 16/122; G06F 21/55
See application file for complete search history.

(56) References Cited

U.S. PATENT DOCUMENTS 5,983,176 A * 11/1999 Hoffert ................ G10H 1/0058
704/233
8,688,601 B2   4/2014 Jaiswal
(Continued)

OTHER PUBLICATIONS

"Overview of labels—Office 365", Retrieved From «https://web.archive.org/web/20170611135128/https:/support.office.com/en-us/article/Overview-of-labels-af398293-c69d-465e-a249-d74561552d30?ui=en-US&rs=en-US&ad=US», Jun. 11, 2017, 30 pages.

(Continued)

*Primary Examiner* — Giovanna B Colan
(74) *Attorney, Agent, or Firm* — Newport IP, LLC; Mike R. Cicero

(57) ABSTRACT

Systems and methods that enable implementation of content aware file management labeling. Techniques disclosed enable real-time analysis of a data file so that associations between the data file and applicable file management label(s) can be automatically suggested and/or made while a user is working in the data file. A user may deploy an application on a client device to edit a data file. While the user is actively editing the data file, the application may transmit modification data to a content analysis service which analyzes the modification data to determine whether the modifications result in a file management label becoming applicable to the data file. Ultimately, the content analysis service may transmit a verdict to the client device to cause the application to display a labeling suggestion to the user and/or to automatically apply a label to the data file while it is being worked on by the user.

20 Claims, 9 Drawing Sheets

(56) References Cited

U.S. PATENT DOCUMENTS

| | | | |
|---|---|---|---|
| 8,805,779 B2 | 8/2014 | Ficara et al. | |
| 9,015,301 B2 | 4/2015 | Redlich et al. | |
| 9,235,562 B1 | 1/2016 | Hart | |
| 9,245,150 B2 | 1/2016 | Grubel et al. | |
| 9,298,813 B1* | 3/2016 | Kraley | G06F 16/35 |
| 9,477,934 B2 | 10/2016 | Lehmann et al. | |
| 9,916,298 B2* | 3/2018 | Link | G06F 16/951 |
| 2003/0088831 A1* | 5/2003 | Bauer | G06F 16/93 |
| | | | 715/809 |
| 2006/0101064 A1* | 5/2006 | Strong | G06F 16/51 |
| 2011/0126281 A1* | 5/2011 | Ben-Zvi | G06F 21/6218 |
| | | | 726/21 |
| 2015/0286533 A1* | 10/2015 | Kaufthal | G06F 16/1787 |
| | | | 707/639 |
| 2016/0048486 A1* | 2/2016 | Lopategui | G06F 40/197 |
| | | | 715/229 |
| 2016/0259794 A1* | 9/2016 | Hickman | G06F 11/1461 |
| 2019/0005235 A1* | 1/2019 | Klonowski | G06F 21/6218 |

OTHER PUBLICATIONS

"Data loss prevention", Retrieved From «http://www.ey.com/Publication/vwLUAssets/EY_Data_Loss_Prevention/$F1LE/EY_Data_Loss_Prevention.pdf», Oct. 2011, 24 Page.

\* cited by examiner

SYSTEMS AND METHODS FOR IMPLEMENTING CONTENT AWARE FILE MANAGEMENT LABELING

PRIORITY APPLICATION

This application claims the benefit of and priority to U.S. Provisional Application No. 62/562,059, filed Sep. 22, 2017, the entire contents of which are incorporated herein by reference.

BACKGROUND

Records management systems enable organizations to define and enforce file management policies for retaining data files for regulatory compliance purposes and/or purging data files for risk management purposes. For instance, an organization may develop a file management policy to abide by government regulations requiring certain financial documents to be retained for a minimum retention period. File management labels may be generated and associated with individual data files to inform records management systems and/or organization personnel that the individual data files are subject to specific file management policies.

Conventional records management techniques rely heavily on people taking an initiative to learn and implement file management policies. For example, to successfully implement a particular file management policy, a person must initially put forth effort to learn application criteria to understand what types of files the particular file management policy is applicable to. Then, this person must consider the application criteria with respect to individual files to determine whether the particular file management policy is applicable. Unfortunately, heavy reliance on people results in sparse and even inconsistent application of file management policies. For instance, while a person is actively working on and is thus familiar with a file, this person's principal focus is to meet an upcoming deliverable. Generally, labeling the file in accordance with file management policies is at best an afterthought. Once this person has moved on to work towards meeting the next deliverable, it is unlikely that previous work products will be revisited specifically for implementing file management policies.

It is with respect to these and other considerations that the disclosure made herein is presented.

DRAWINGS

The Detailed Description is described with reference to the accompanying figures. In the figures, the left-most digit(s) of a reference number identifies the figure in which the reference number first appears. The same reference numbers in different figures indicates similar or identical items. References made to individual items of a plurality of items can use a reference number with a letter of a sequence of letters to refer to each individual item. Generic references to the items may use the specific reference number without the sequence of letters.

Figure 3A:
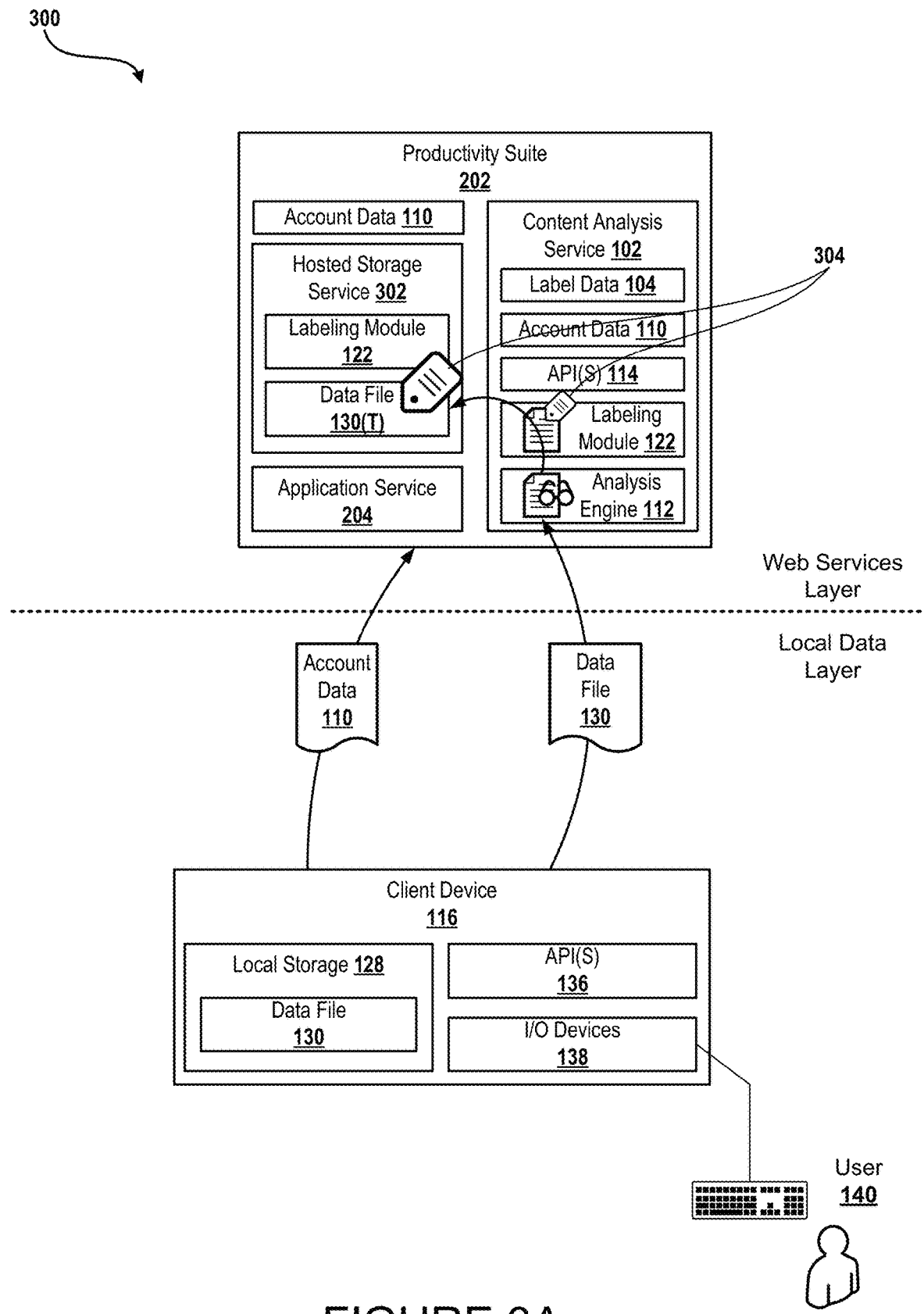
FIG. 3A illustrates an exemplary dataflow scenario in which content of a data file that is uploaded onto a hosted storage service of a productivity suite is analyzed by a content analysis service of the productivity suite to identify associations between the data file and one or more file management labels.
Figure 3B:
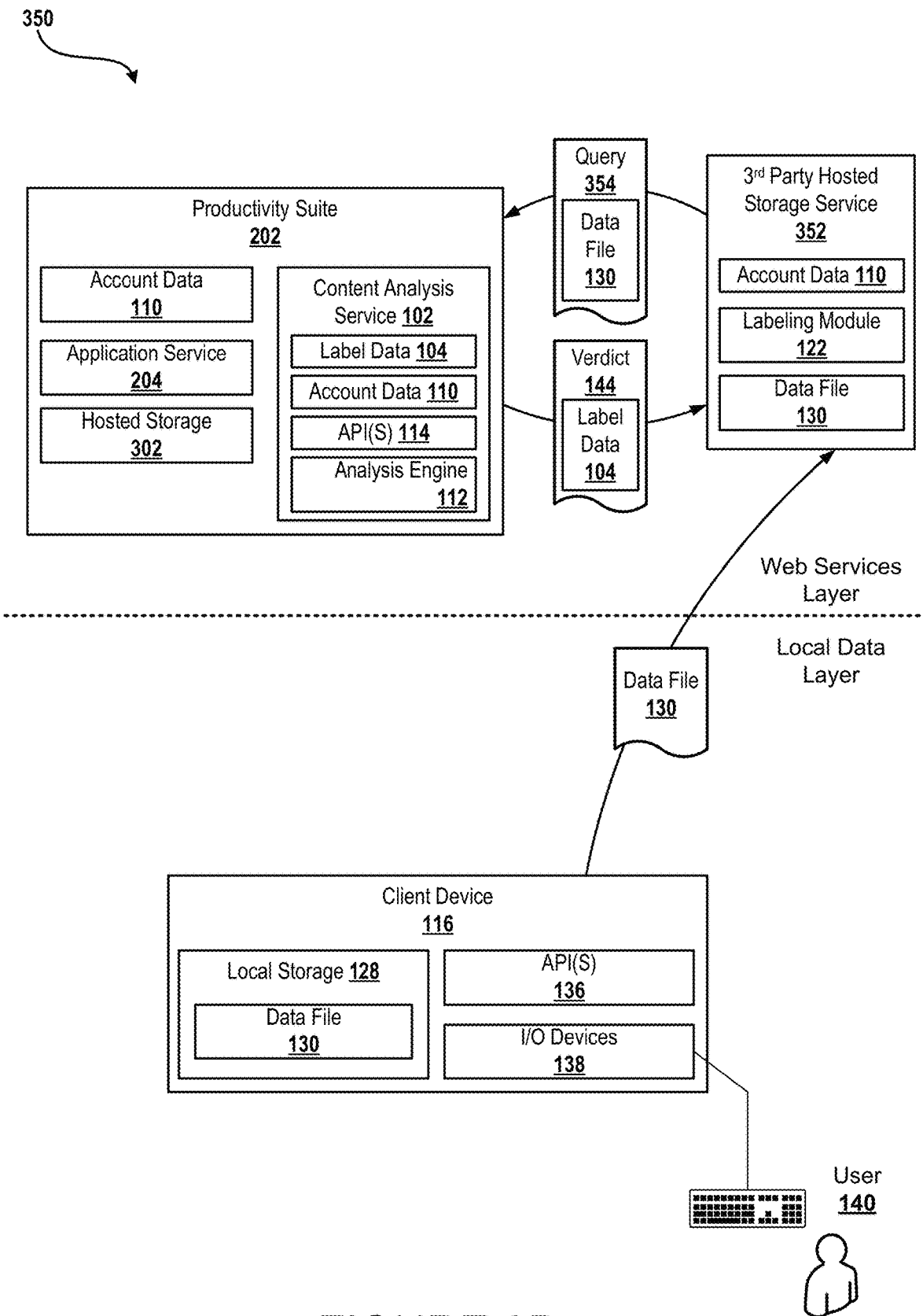

FIG. 3B illustrates an exemplary dataflow scenario in which a data file is uploaded to a third-party hosted storage service which then transmits a query as to whether any file management labels are applicable to the data file to a content analysis service. The content analysis service then returns a verdict which instructs a labeling module of the third-party hosted storage service as to whether to associate any particular file management labels with the data file.

Figure 4:
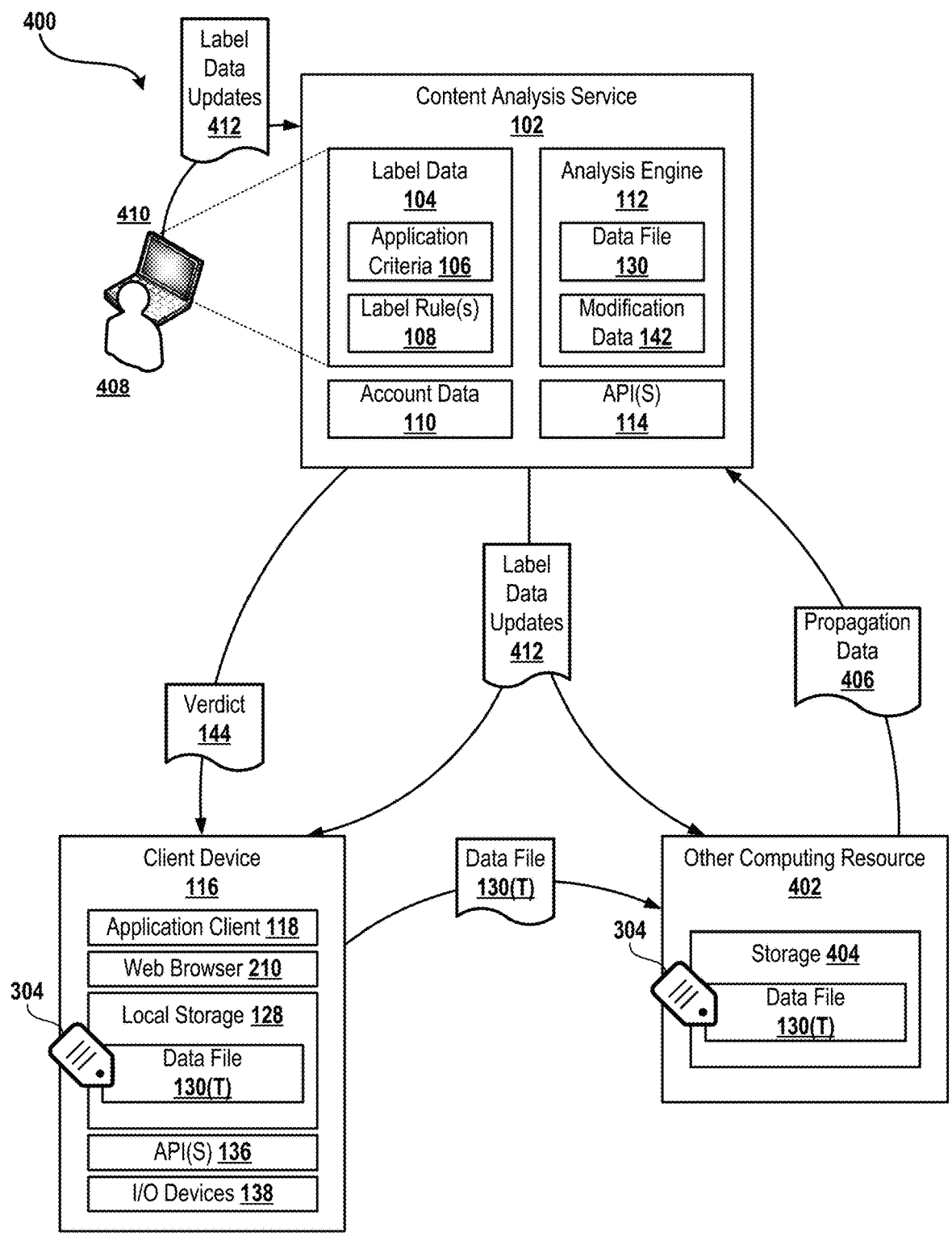

FIG. 4 illustrates an exemplary data flow scenario in which multiple instances of a data file that is associated with a file management label are propagated through multiple computing resources. Within these computing resources label data updates are transmitted based on centralized updates to the file management label.

Figure 5A:
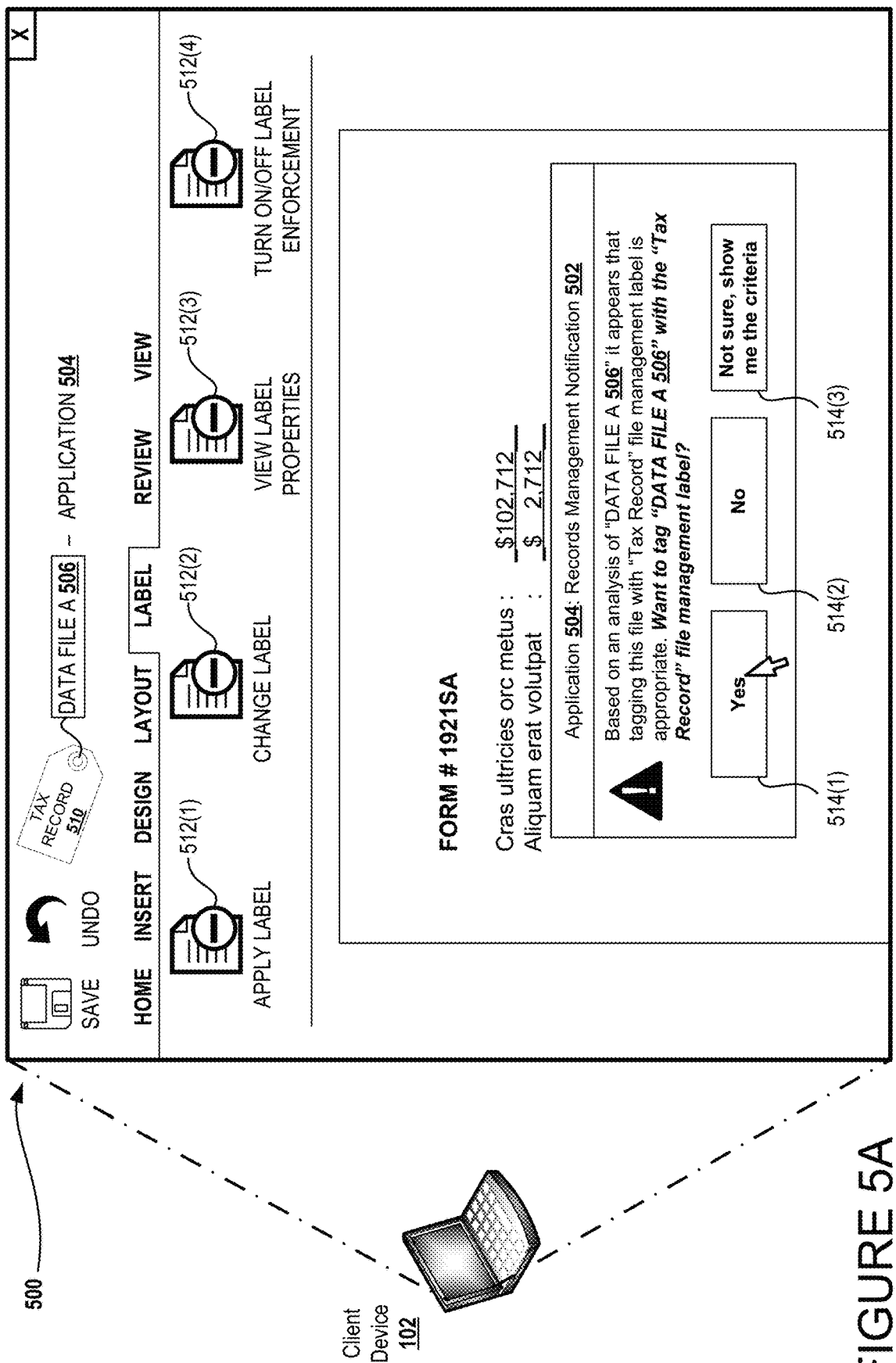

FIG. 5A illustrates aspects of a graphical user interface (GUI) that includes a notification that suggests to a user that a particular file management label is applicable to a data file that is currently open within an application.

Figure 5B:
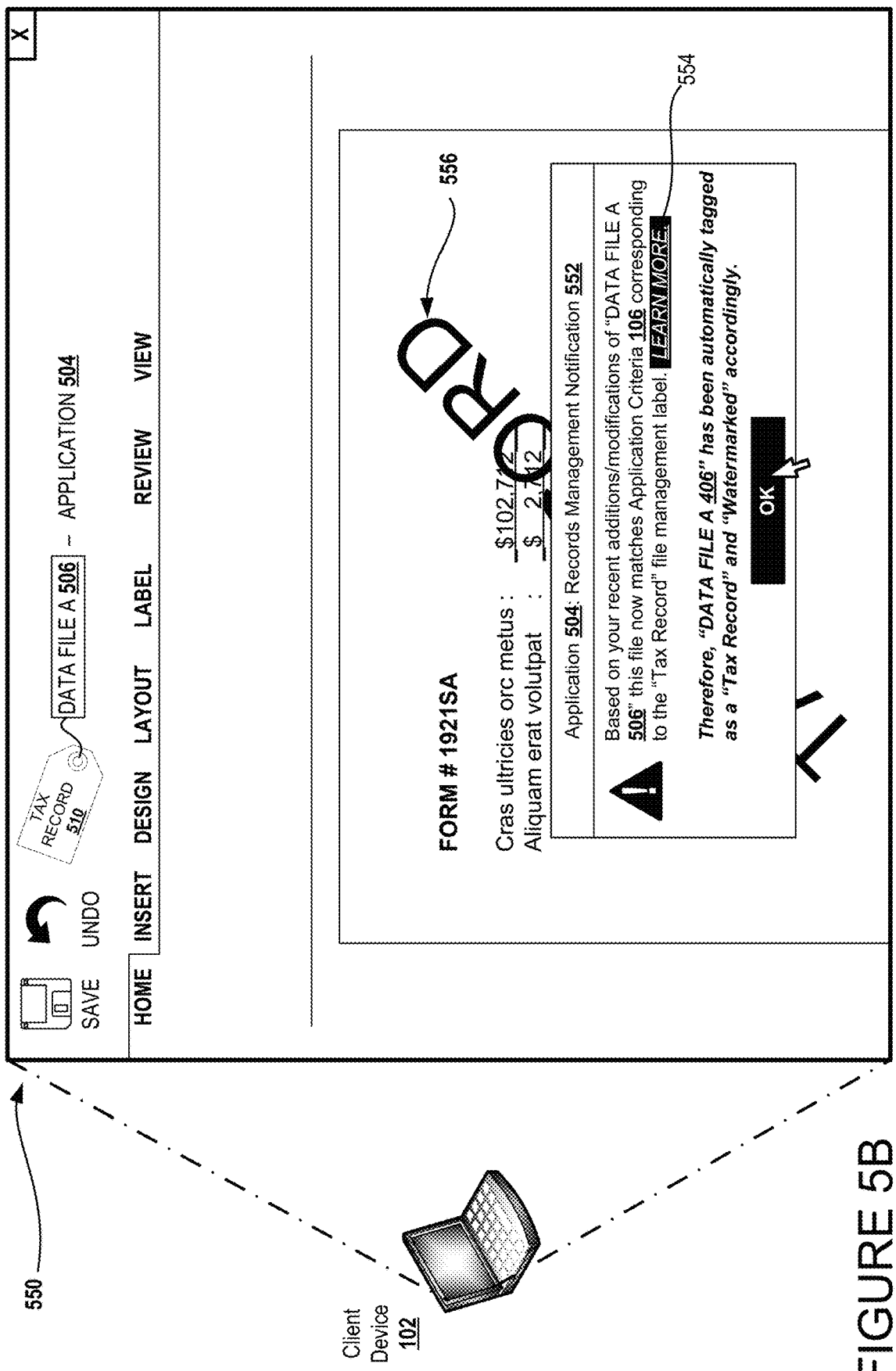

FIG. 5B illustrates aspects of a GUI that include a notification that informs a user that additions or modifications to a data file that is currently open within an application have resulted in an automatic application of a particular file management label.

Figure 6:
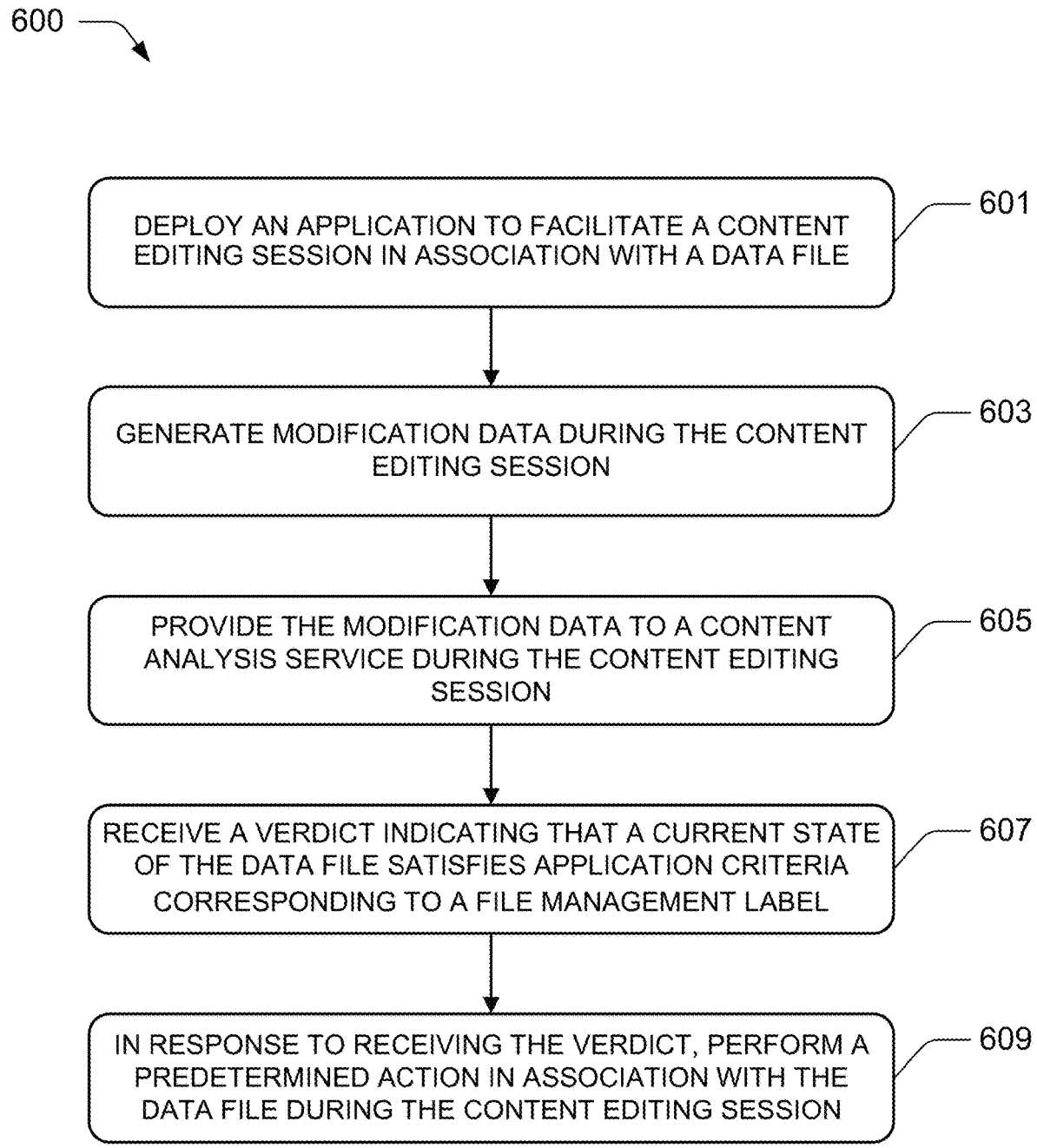

FIG. 6 is a flow diagram illustrating an example process of providing modification data that is generated during a content editing session to a content analysis service and receiving back from the content analysis service a verdict indicating whether a current state of the data file satisfies application criteria of a file management label.

Figure 7:
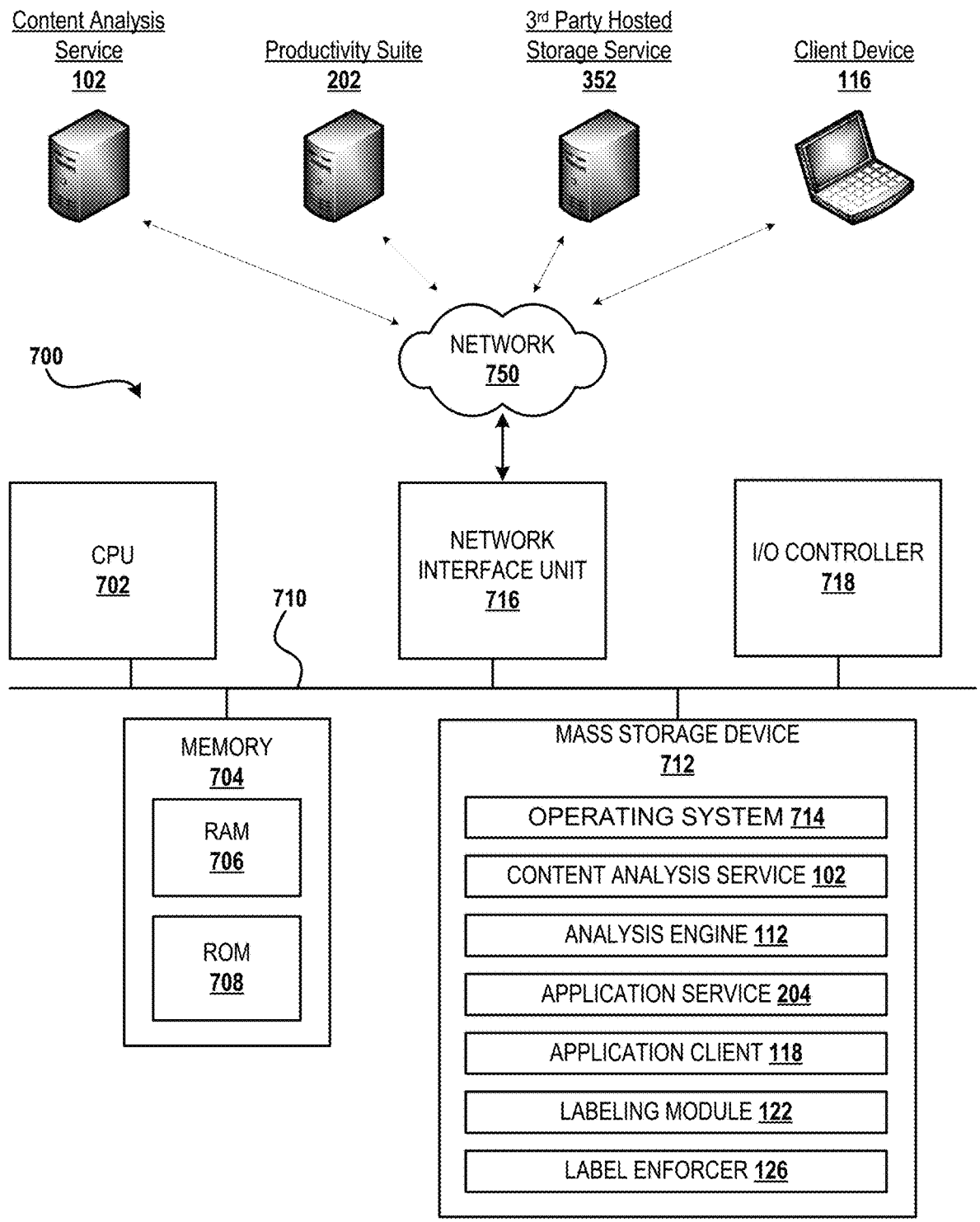

FIG. 7 shows additional details of an example computer architecture for a computer capable of executing the functionalities described herein.

DETAILED DESCRIPTION

The following Detailed Description describes systems and methods that enable implementation of content aware file management labeling. Generally described, variations disclosed herein enable real-time analysis of a data file's content so that associations between the data file and an applicable file management label(s) can be automatically suggested and/or made while a user is working in the data file. In some embodiments, an application may be configured to pass modification data to a content analysis service during a session in which content of a data file is being actively created and/or edited via a client device. For example, an application client (e.g., a Word Processing Application such as MICROSOFT WORD) may run on a client device (e.g., a laptop PC) to enable a user to work in a data file. While the user is actively modifying the content of the data file (e.g., by using a keyboard to type new content into the data file), the application client may continually and/or periodically transmit modification data to the content analysis service. In some implementations, the modification data may indicate modifications that are being made to the content by the user in substantially real-time. The content analysis service may then analyze the modification data to determine whether the modifications result in a file management label becoming applicable (or ceasing to be applicable) to the data file. Ultimately, the content analysis service may transmit a verdict to the client device to cause the application client to display a labeling suggestion to the user and/or to automatically apply a label to the data file while it is being worked on by the user.

As described above, conventional records management techniques rely heavily on individual users to learn and implement file management policies which, unfortunately, result in sparse and inconsistent application of such policies. Among many other benefits, the techniques described herein improve efficiencies with respect to leveraging computing resources to uniformly and consistently implement file management policies. For instance, human interaction with records management systems may be improved as the use of the techniques disclosed herein efficiently leverage automatic content analysis to trigger substantially real-time implementation of file management policies while a user is actively working in a data file. Benefits of such techniques include, but are not limited to, enabling the user to confirm and/or revoke labeling suggestions that result from automatic content analysis while the user is intimately familiar with content of the data file and without the user having to reference ancillary resources to become apprised of application criteria. It can further be appreciated that improved human interaction improves other computing resources such as processor and network resources. For example, computing interactions, traffic, and processing cycles are reduced because users can stay within a single application to both create and modify content while associations between the data file and applicable file management labels are automatically suggested and/or made based on back-end analysis of the content of the data file.

To illustrate aspects of the techniques disclosed herein: FIGS. 1-5B illustrate various data flow scenarios and other aspects of systems, graphical user interfaces (GUIs), and methods that enable implementation of content aware file management labeling. Similar to other illustrations described herein, it can be appreciated that operations and/or functionalities may be described according to a logical flow of data between various components. The order in which these operations and/or functionalities are described and/or illustrated herein is not intended to be construed as a limitation. Rather, any number of the operations and/or functionalities described with respect to any one of FIGS. 1-5B, may be combined in any order and/or in parallel in accordance with the present disclosure. Other processes and/or operations and/or functionalities described throughout this disclosure shall be interpreted accordingly.

Figure 1:
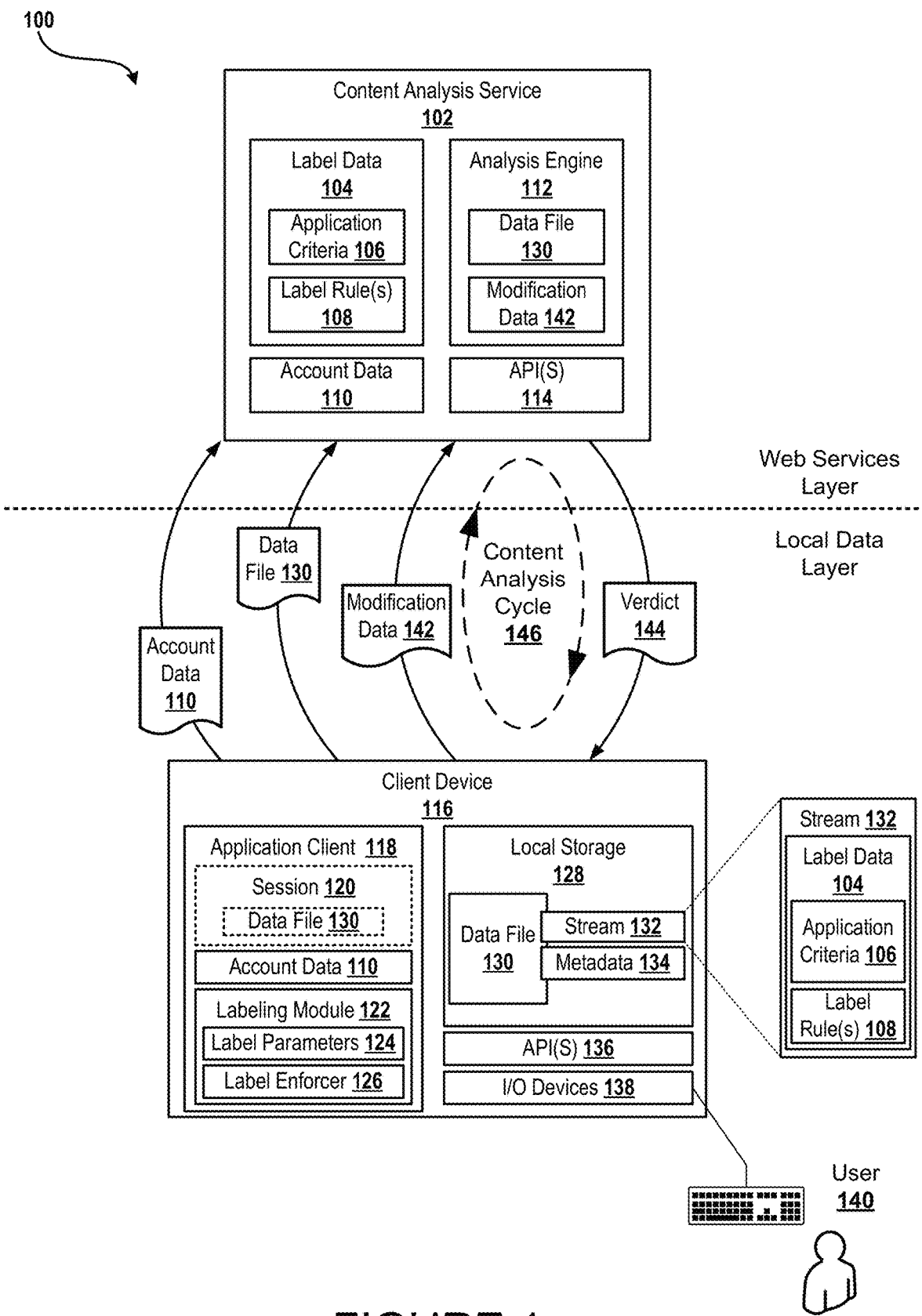
FIG. 1 illustrates an exemplary system in which a client device and a content analysis service communicate with one another to facilitate a content analysis cycle during which associations between a data file and a file management label(s) are automatically suggested and/or made while a user is working in the data file.

Turning now to FIG. 1, an exemplary system 100 is illustrated in which a client device 116 and a content analysis service 102 communicate with one another to facilitate a content analysis cycle 146. In the illustrated scenario, a client device 116 transmits to a content analysis service 102 at least some modification data 142 associated with modifications made by a user to a data file 130 during a session 120 of an application client. Based on an analysis of the modification data 142, the content analysis service 102 may return to the client device 116 a verdict 144 which may be indicative of an association between the data file 130 and the file management label(s). Thus, it can be appreciated that during the content analysis cycle 146, associations between the data file 130 and a file management label(s) are automatically suggested and/or made while a user is using an application client to actively work on a data file 130.

In the illustrated embodiment, the content analysis service 102 is shown to include label data 104 that defines various aspects of one or more file management labels, account data 110 that defines parameters associated with individual and/or organizational user accounts, an analysis engine 112 for analyzing the label data 104 with respect to content of the data file 130 and/or corresponding modification data 142 (e.g., to identify associations between the data file 130 and the file management label(s)), and an application programming interface (API) 114 that exposes an interface through which the content analysis service 102 communicates data with other devices and services described herein). For example, as described in detail below, the API 114 may enable the content analysis service 102 to receive the account data 110 and/or modification data 142 from the client device 116 and/or to provide a verdict 144 back to the client device 116.

As further illustrated, the client device 116 is shown to include an application client 118 that provisions a user 140 with access to content of the data file 130, a local storage 128, an API 136, and input and/or output (I/O) devices 138. The application client 118 provisions the user 140 with access to content of the data file 130 during a session 120 in which the user 140 can interpret and/or modify the content of the data file 130 via the I/O devices 138. For example, the user may view the content of the data file 130 via a graphical user interface (GUI) generated by a display output device and can modify the content of the data file 130 via a keyboard (illustrated next to the user 140). Exemplary application clients 118 include, but are not limited to, ADOBE ACROBAT PRO, MICROSOFT WORD, MICROSOFT EXCEL, MICROSOFT POWERPOINT, and/or any other suitable software for viewing and/or modifying data files of various formats. Local storage 128 includes one or more non-volatile data storage devices (e.g., a SATA-Type Hard Disk, SATA-Type solid state hard drive, a USB flash drive, etc.) and/or volatile data storage devices (e.g., Random Access Memory (RAM), etc.) that may store the data file 130. The API 136 exposes an interface through which the client device 116 communicates data with other devices and/or services described herein. For example, as described in more detail below, the API 136 may enable the client device 116 to transmit account data 110 and/or modification data 142 to the content analysis service and/or to receive the verdict 144 from the content analysis service 102. The I/O devices 138 enable the user to interact with the client device 116. For example, as illustrated, the I/O devices 138 may include a keyboard to enable the user to modify content of the data file 130 during the session 120 (e.g., a word processing session).

With respect to the operational flow of the scenario illustrated in FIG. 1, the content analysis cycle 146 is initiated based at least in part on the user 140 deploying the application client 118 to initiate the session 120 during which the application client 118 provisions the user with the ability to access and/or edit content of the data file 130. For example, suppose that the data file 130 is an Office Open XML (OOXML) formatted file (e.g., a ".docx" file) and that the content of the data file 130 is stored in the local storage 128 within the Stream 132 (e.g., a FileStream of the "System.IO" data stream class). In this example, the client device 116 may receive an instruction to open the data file 130 using the application client 116 due to this application client being a default application with respect to the indicated file extension of the data file (e.g., ".docx"). As a more specific but nonlimiting example, the user 140 may manipulate the I/O devices 138 to "double-click" an icon that represents the data file 130 which in turn generates an instruction indicating the stream 132 that corresponds to the data file 130 and the file extension of the data file (e.g., an Open (Stream=Stream A 116(A), FormatType=.docx) Method instruction). In response, the client device 116 may deploy the application client 118 to access the stream 132 to open and, ultimately, to enable the user 140 to view and/or modify content of the data file 130.

In some implementations, upon the user 140 deploying the application client 118 to access the content of the data file 130, the application client 118 may transmit the account data 110 to the content analysis service 102. In some implementations, the account data 110 is stored in association with the application client 118 and is transmitted automatically at the outset of the session 120. In some implementations, the user 140 may be prompted to manually enter account data 110 such as, for example, user credentials at the outset of the session 120. The account data 110 may include user credentials associated with an individual and/or organizational user account to enable the content analysis service 102 to determine which aspects of the label data 104 correspond to the current session 120. For example, the label data 104 may indicate label names, application criteria 106, and/or label rule(s) 108 for tens, hundreds, or even thousands of individual file management labels. Based on the account data 110 received in association with the session 120, the content analysis service 102 may determine which individual one(s) of the file management labels are applicable to the session 120.

The application criteria 106 may indicate one or more characteristics that may result in an individual file management label being applicable to an individual data file. The label rules 108 may indicate one or more actions that are to be performed with respect to individual data files that have been associated with an individual file management label. As a specific but nonlimiting example, an organization may be required to retain tax related documents for at least a predefined period of time (e.g., a "minimum retention period"). Accordingly, the organization may define a retention policy for tax related documents that includes retaining the documents for the predefined period of time (e.g., to comply with government regulations) and then immediately delete the documents (e.g., for risk management purposes). Under these circumstances, the label data 104 may define a "Tax Record" file management label (e.g., the name of this individual file management label is "Tax Record"). Also, the application criteria 106 may define specific characteristics which result in individual data files being classified as tax records. For example, the application criteria 106 may indicate that any data file that includes the organization's Federal Tax Identification Number (e.g., an EIN) is to be classified as a tax record for file management purposes. The label data 104 may further define label rules 108 that are to be performed with respect to individual data files that are classified as tax records. For example, the label rules 108 may indicate that tax records are to be forcibly retained for a period of seven years and then immediately disposed of. Furthermore, continuing with this example, upon receiving the account data 110 in association with the session 120, the content analysis service 102 may determine whether the "Tax Record" file management label is applicable to the user 140 and/or the session 120. For purposes of the present discussion, presume that the "Tax Record" file management label is applicable to the user 140 and/or the session 120 such that the content analysis service 102 is to analyze the content of the data file 130 with respect to application criteria 106 of the "Tax Record" file management label.

In some embodiments, at the outset of the session 120 the application client 118 may access the APIs 136 to transmit an instance of the data file 130 to the content analysis service 102. This instance of the data file 130 may provide the content analysis service 102 with information defining an initial state from which modifications and/or additions to the data file 130 (e.g., as indicated by the modification data 142 described below) have been applied to the data file. For example, if the initial state of the data file 130 provided to the content analysis service 102 indicates that the content of the data file consists of four paragraphs and the modification data includes a fifth paragraph and an indication that this fifth paragraph has been appended to the data file 130 after the fourth paragraph which the content analysis service 102 already had knowledge of (e.g., based on the data file 130), it can be appreciated that the content analysis service can determine the current state of the data file as it exists within the session 120 on the client device 116.

During the session 120 (e.g., while the data file 130 is "open" within the application client 118), the user 140 may actively generate and/or modify the content of the data file 130. For example, continuing with the scenario in which the data file 130 is an Office Open XML (OOXML) formatted file, the application client 118 may be a word processing application that the user 140 is using to modify the content which may include, for example, text characters, text strings, tables, charts, form fields, and/or any other content suitable for generating and/or editing via a word processing application. As a more specific but nonlimiting example, the user 140 may open the data file 130 and may deploy a keyboard and/or mouse of the I/O devices 138 to type an organization's "EIN" number into a form field of the data file 130.

The application client 118 may monitor additions and/or modifications made by the user 140 to the content of the data file 130 and, based thereon, may generate modification data 142. In some implementations, the modification data 142 may be indicative of the current state of the data file 130. For instance, the modification data 142 may indicate a plurality of modifications and/or additions that a user has made to the data file 130 since the instance of the data file 130 was initially transmitted to the content analysis service 102. The modification data 142 may further indicate precisely where in the data file 130 individual ones of the modifications and/or additions have been applied. Accordingly, it can be appreciated that by applying modifications and/or additions indicated by the modification data to the previously received instance of the data file 130, the current state of the data file 130 may be determined. As illustrated, the modification data 142 may be transmitted by the client device 116 to the content analysis service 102 during a session 120.

Upon receiving the modification data 142, the content analysis service 102 may deploy an analysis engine 112 to determine whether the current state of the data file 130 satisfies application criteria 106 of any individual file management label(s). The analysis engine 112 may determine the current state of the data file 130 by applying any modifications and/or additions indicated by the modification data 142 to the data file 130. For example, continuing with the scenario in which the content analysis service 102 was provided with the instance of the data file 130 which indicates the initial state from which modifications and/or additions are subsequently applied, upon receipt of a first instance of modification data 142, the analysis engine 112 may apply first modifications and/or additions to the initial state to determine the current state of the data file 130. Then, upon receipt of a second instance of modification data 142, the analysis engine 112 may apply second modifications and/or additions to the previously determined current state to determine an updated current state of the data file 130. Then, each time an additional instance of modification data 142 is provided to the content analysis service 102, the previously determined current state may be updated based on any newly applied modifications and/or additions.

Based on the sequential instances of the modification data 142, the analysis engine 112 may analyze the current states of the data file 130 against the label data 104 to determine whether any individual file management label(s) have become applicable and/or have ceased to be applicable based on one or more instances of the modification data 142. For example, continuing with the specific but nonlimiting example in which the user 140 opens the data file 130 and types the organization's "EIN" number into the form field of the data file 130, a particular instance of the modification data 142 may enable the analysis engine 112 to determine that the current state of the data file 130 (e.g., the state of the data file 130 as it exists within the session 120 at the client device 116) satisfies application criteria 106 of the "Tax Record" file management label.

In various implementations, the application criteria 106 may indicate one or more sensitive content types based on predefined patterns that can be identified based on a regular expression (REGEX) and/or function. For example, the application criteria 106 may include an indication of a REGEX to cause the analysis engine 112 to parse the content of the data file 130 to identify one or more number strings and, ultimately, to analyze the one or more number strings to determine whether sensitive information (e.g., tax identification numbers, credit card numbers, HIPPA Data, etc.) are included within the content of the data file 130. As another example, the application criteria 106 may define a search query to be performed by the analysis engine 112 against the content of the data file 130 to cause the file management label to be associated with individual data files that contain at least one of a predefined set of terms. As a more specific but nonlimiting example, the application criteria 106 may define a search query to cause files that contain at least one of the terms "Tax*" or "Form 1099*" to be designated as tax records and, therefore, automatically labeled with a "Tax Record" file management label. Although any suitable search query language may be deployed to define application criteria 106, exemplary search query languages include the Keyword Query Language (KQL) and the FAST Query Language (FQL) which are included in MICROSOFT SHAREPOINT.

Based on analyzing the current states of the data file 130 against the application criteria 106, the content analysis service 102 may generate a verdict 144 that is transmitted to the client device 116 to inform a labeling module 122 of the application client 118 whether any individual file management label(s) have become applicable and/or ceased to be applicable to the data file 130. The labeling module 122 then executes one or more tasks in association with the verdict 144. Exemplary tasks include, but are not limited to, automatically applying to the data file one or more file management labels that are identified within the verdict 144 and/or causing a notification to be presented (e.g., visually and/or audibly) to the user 140 that indicates one or more file management labels that might be (or are already conclusively determined to be) applicable to the data file 130. In some implementations, the verdict 144 may indicate the one or more tasks that the labeling module 122 is to perform. For example, the verdict 144 may instruct the labeling module 122 as to whether to automatically associate a particular file management label with the data file or whether to present notification to the user 140 that suggests that the particular file management label be applied. Additionally or alternatively, the labeling module 122 may include label parameters 124 that indicate the one or more tasks that the labeling module 122 is to perform upon receipt of the verdict 144. For example, the label parameters 124 may indicate whether a particular file management label that is indicated by the verdict 144 as being applicable to the data file 130 should be automatically applied to the data file upon receipt of the verdict 144 or whether the final determination as to whether to apply to particular file management label is to be left to the user 140.

As illustrated, the local storage 128 may include both of a stream 132 and metadata 134 corresponding to the data file 130. The stream 132 may define the content of the data file 130 and may be stored in a format that corresponds to the application client 118. For example, in a scenario in which the application client 118 is a word processing application that is configured to read and/or enable editing of Office Open XML (OOXML) formatted files, the stream 132 may be a ".docx" file that defines the content of the data file 130. The metadata 134 may indicate various properties of the data file 130. Exemplary properties include, but are not limited to, a file type corresponding to the data file 130 (e.g., as indicated by a file extension such as "docx," ".xlsm," ".xlsx," etc.) that indicates which application(s) can be used to open the stream 132, a size of the data file 130 (e.g., in terms of bytes), a creation date of the data file 130, an author of the data file 130, etc.

As illustrated in FIG. 1, in various embodiments, the labeling module 122 may be configured to write label data 104 associated with the verdict 144 directly into the stream 132 of the data file 130. For example, the verdict 144 may include a portion of the label data 104 that defines a particular file management label. Then, in response to receiving the verdict 144 and/or an indication from the user 140 to associate the particular file management label with the data file 130, the labeling module 122 may save that portion of the label data 104 directly into the stream 132 of the data file 130. Additionally or alternatively, the labeling module 122 may be configured to write the portion of the label data 104 into the metadata 134. In some implementations, writing the label data 104 into the metadata 134 enables a user to perform a "right-click" operation on an icon, of the data file, that is generated by an operating system (e.g., a file icon generated by MICROSOFT WINDOWS) to expose properties associated with the data file. These properties may include one or more data fields associated with the presence and/or absence of associations between the data file and one or more file management labels.

In some implementations, the portion of the label data 104 may define one or both of the application criteria 106 and/or the label rules 108. It can be appreciated therefore that in some implementations individual data files and any associated file management label(s) are essentially self-contained objects. For example, no supplementary database need be accessed to determine why any individual data file is labeled with a particular file management label nor does any supplementary database need to be accessed to determine what actions are to be performed with respect to individually labeled data files.

In some implementations, the application client 118 may include a label enforcer 126 that enforces the label rules 108 with respect to individual data files. For example, continuing with the "Tax Record" file management label example, suppose that an individual data file that is six years old and that has been labeled as a tax record is currently open within the session 120. Further suppose that a user attempts to delete and/or modify various aspects of the individual data file notwithstanding the label rules 108 indicating that tax records are to be preserved for seven years. Under these circumstances, the label enforcer 126 may prevent the deletions and/or modifications from being saved with respect to the data file 130 (e.g., into the stream 132). Alternatively, the label enforcer 126 may enter the deletions and/or modifications in conjunction with versioning data (e.g., via a "Track Changes" functionality of the application client 118) to maintain a record of the content in the absence of the deletions and modifications. As another example, suppose that a user attempts to utilize the application client 118 to open an individual data file that is nine years old and that has been labeled as a tax record and, therefore, should have been deleted immediately upon reaching seven years of age. Under these circumstances, the application client 118 may deploy the label enforcer 126 to analyze the label data 104 to determine whether the label rules 108 permit the individual data file to be accessed. Then, before any of the content of the individual data file is exposed to a user, the label enforcer 126 may determine that the label rules 108 indicate that the individual data file should have been deleted. Ultimately, the label enforcer 126 may respond by corrupting and/or overwriting the data file 130 to prevent any current and/or future unauthorized access of the individual data file.

Based on the operational flow discussed with respect to FIG. 1, it can be appreciated that the content analysis cycle 146 may be a process in which sequential instances of modification data 142 are generated at the client device 116 at a local data layer and transmitted to the content analysis service 102 at a Web services layer. Then, upon receipt of individual instances of the modification data 142, the content analysis service 102 determines whether the current state of the data file 130 that is being actively viewed and/or modified within the session 120 satisfies application criteria 106 corresponding to any potentially applicable file management label. In some implementations, individual instances of the modification data 142 may be generated and/or transmitted at predetermined intervals of time. For example, a new instance of the modification data 142 may be generated and transmitted by the application client 118 every one minute, every five minutes, every thirty minutes, etc. Additionally or alternatively, individual instances of the modification data 142 may be generated and/or transmitted based upon one or more trigger events. For example, a new instance of the modification data 142 may be generated and transmitted by the application client 118 each time the user saves the data file into the local storage 128 and/or each time the user enters a predetermined number of modifications and/or additions (e.g., every 100 keystrokes, every fifth keystroke, every individual keystroke, etc.). Thus, it can be appreciated that during the content analysis cycle 146, associations between the data file 130 and a file management label(s) are automatically suggested and/or made while a user is using an application client to actively work on a data file 130.

Figure 2:
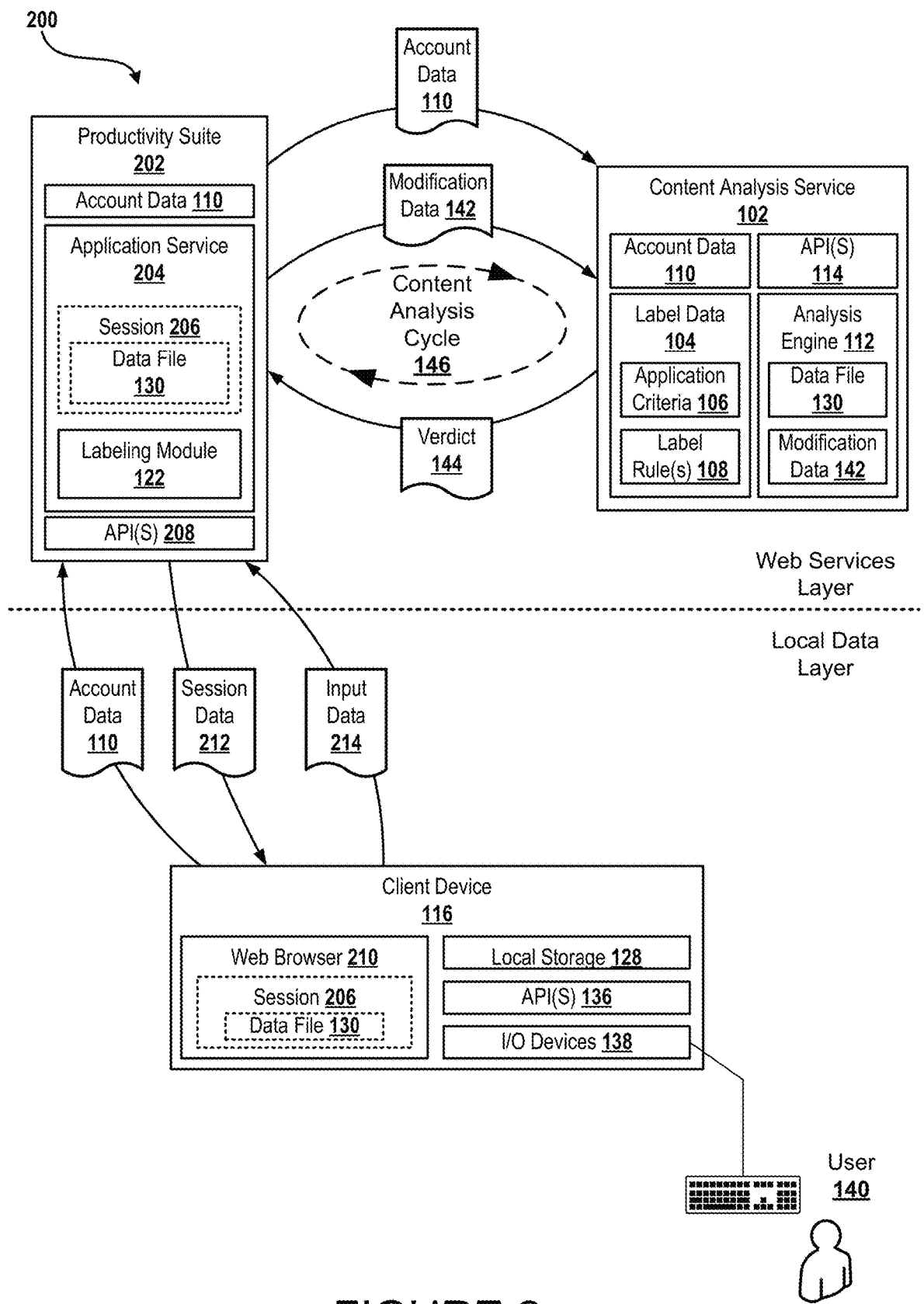
FIG. 2 illustrates an exemplary system in which a client device accesses an application service which in turn communicates with a content analysis service to facilitate a content analysis cycle in association with a web-session.

Turning now to FIG. 2, an exemplary system 200 is illustrated in which the client device 116 accesses an application service 204 which in turn communicates with the content analysis service 102 to facilitate the content analysis cycle 146 in association with a session 206. In the illustrated scenario, the application service 204 is being deployed by a productivity Suite 202 that provisions the user 140 with access to one or more web-based services such as, for example, application services and/or file hosting services. Exemplary productivity suites include, but are not limited to, GOOGLE G-SUITE, ZOHO OFFICE SUITE, or MICROSOFT OFFICE 365. In some embodiments, the productivity suite 202 may provision the user with access to the application service 204 in response to receiving account data from the user 140 via the client device 116. Exemplary account data 204 includes, but is not limited to, user credentials associated with individual users and/or account settings corresponding to the individual user accounts. As a more specific but nonlimiting example, user 140 may be provisioned with access to the application service 204 upon providing productivity suite 202 with user credentials (e.g., a password and/or a token). The application service 204 may be configured to facilitate a session 206 during which a user is enabled to open, view, edit, create, save, copy, or otherwise manipulate files such as, for example, text documents, spreadsheets, and/or presentation documents. Exemplary application services include, but are not limited to, MICROSOFT WORD ONLINE, MICROSOFT EXCEL ONLINE, MICROSOFT POWERPOINT ONLINE, GOOGLE DOCS, GOOGLE SHEETS, and/or GOOGLE SLIDES.

As used herein, the term "application" may refer generally to any software that is specifically configured for producing, modifying, and/or accessing information such as, for example, email, word processing documents, presentations, and/or workbooks (a.k.a. "worksheets"). Furthermore, the term "application client" may refer to any "application" that is locally run on a client device (e.g., a Smart Phone, a Tablet PC, a Laptop PC, or any other general-purpose computing device). In contrast, the term "application service" may refer to any "application" that is a web-based software that is run remotely from a client device and exposed to the client device (e.g., via a web browser application).

FIG. 2 further illustrates an exemplary operational flow in which the user 140 utilizes a web browser 210 to access an application service 204 and, ultimately, to modify the data file 130 via the session 206. It can be appreciated that the session 206 that is facilitated by the application service 204 is essentially a web-based version of the session 120 that is facilitated by the application client 118 as discussed with relation to FIG. 1. As a specific but nonlimiting example, the user 140 may provide the productivity suite 202 with user credentials such as, for example, a user name and a password combination. Upon authenticating the user 140, the productivity suite 202 provisions the user 140 with access to the application service 204 which is exposed at the client device 116 via the web browser 210. It can be appreciated that the operational flow of FIG. 2 is similar to the operational flow of FIG. 1 with the exception that the application facilitating the session is a web based application service 204 rather than a locally run application client 118. As a result, in the scenario illustrated in FIG. 2, the content analysis cycle 146 does not cross the boundary between the web services layer in the local data layer but rather corresponds to data flows that occur between the productivity suite 202 and the content analysis service 102 which both reside within the web services layer.

It can be appreciated therefore that the content analysis cycle 146 is initiated based at least in part on the user 140 deploying the application service 204 to initiate the session 206 during which the application service 204 provisions the user 140 with the ability to access and/or edit content of the data file 130. For example, as illustrated, the user 140 utilizes the client device 116 to provide account data 110 to the productivity suite 202 which initiates the session 206. In some implementations, the productivity suite 202 may relay the account data 110 to the content analysis service 102 as illustrated to enable the content analysis service 102 to determine which portions of the label data 104 are applicable to the session 206. As further illustrated, the productivity Suite 202 provides session data 212 to the web browser 210 to cause a display (not shown) of the I/O devices 138 to graphically display a current state of the data file 130. The user 140 may then generate input data 214 to generate and/or edit the content of the data file 130. The input data 214 is ultimately transmitted to the productivity Suite 202 to enable the application service 204 to reflect in the current state of the data file content that is edited and/or generated by the user 140.

During the session 206, the productivity Suite 202 may communicate with the content analysis service 102 in a similar fashion to how the client device 116 is described to communicate with the content analysis service 102 with respect to FIG. 1. In particular, the application service 204 may continuously and/or periodically transmit modification data 142 to the content analysis service 102. The modification data 142 may directly correspond to the input data 214, e.g., the modification data 142 reflects additions and/or edits made by the user 140. Upon receipt of the modification data, the analysis engine 112 determines whether application criteria of any particular file management label is satisfied by the current state of the data file 130. Ultimately, the content analysis service 102 returns a verdict 144 to the labeling module 122 of the application service 204 which is similar to the labeling module 122 described in relation to the application client 118. The session data 212 may include various aspects of the verdict 144. For example, as discussed in relation to FIG. 1, the verdict may correspond to generating a notification that includes a suggestion for the user 140 to associate a particular file management label with the data file 130. Accordingly, the session data 212 may cause such a notification to be displayed via the web browser 210 at the client device 116.

It can be appreciated that the operational flow illustrated in FIG. 2 may correspond to an embodiment in which the content analysis service 102 is deployed on computing resources that are discrete from one or more other computing resources on which the productivity Suite 202 is deployed. For example, the productivity Suite 202 may be deployed on a first set of computing resources such as, for example, a first allocation of web resources (e.g., a first set of virtual servers) while the content analysis service 102 is deployed on a second set of computing resources such as, for example, a second allocation of web resources (e.g., a second set of virtual servers). Accordingly, it can be appreciated that in some implementations the content analysis service 102 may be facilitated by a separate business entity as compared to the productivity Suite 202. In some embodiments, the content analysis service 102 may be deployed on common computing resources with the productivity Suite 202. For example, the content analysis service 102 may in some implementations be integrated into the productivity Suite 202.

Turning now to FIG. 3A, an exemplary dataflow scenario 300 is illustrated in which content of a data file 130 that is uploaded onto a hosted storage service 302 of the productivity Suite 202 is analyzed by the content analysis service 102 to determine whether application criteria 106 of one or more file management labels are satisfied by the data file 130. In the illustrated example, both the hosted storage service 302 and the content analysis service 102 are facilitated by the productivity Suite 202. As further illustrated, upon the user 140 uploading the data file 130 to the hosted storage service 302, the content analysis service 102 may deploy the analysis engine 112 to analyze the content of the data file 130 with respect to the label data 104.

In some implementations, the content analysis service 102 may include a labeling module 122 in addition to the analysis engine 112, and the data file 130 may be routed through both the analysis engine 112 and the labeling module 122 (of the content analysis service 102) prior to being relayed to the hosted storage service 302. In these implementations, the data file 130 may be transmitted from the client device 116 before any file management label has been associated therewith. Then, the analysis engine 112 may analyze the data file 130 and determine whether one or more characteristics (e.g., types of content, an author, a data range of creation, one or more keywords, etc.) of the data file 130 satisfies application criteria 106 corresponding to a particular file management label 304. In the event that the analysis engine 112 determines that the characteristics of the data file satisfy the application criteria 106 of the particular file management label 304, the labeling module 122 may be deployed to "tag" the data file 130 with the particular file management label 304. Then, once the data file 130 has been tagged with the particular file management label 304, the content analysis service 102 may pass the now "tagged" version of the data file 130(T) to the hosted storage service 302. It can be appreciated therefore that the various techniques of the present disclosure may be applicable to data files that are not currently open within a particular session of an application.

In some implementations, the data file 130 may be uploaded directly into the hosted storage service 302. Then, the productivity Suite 202 may periodically deploy the content analysis service 102 to analyze data files stored on the hosted storage service 302. In the event that individual data files that are already hosted on the hosted storage service 302 are untagged but satisfy application criteria 106 corresponding to a particular file management label 304, a labeling module 122 on the hosted storage service 302 and/or content analysis service 102 may be deployed to generate the tagged version of the data file 130(T).

As illustrated, in various implementations the user 140 may also transmit account data 110 from the client device 116 to the productivity Suite 202 similar to other implementations described herein, the content analysis service 102 may determine which file management policies and/or file management labels are potentially applicable to the data file 130. Then, the content analysis service 102 may analyze the data file against the application criteria of the potentially applicable file management labels.

In some implementations, "tagging" a data file with a file management label may include generating an association in a database that is external to the data file to indicate that the file management label has been affixed or otherwise associated with the data file. In some implementations, "tagging" a data file with a file management label may include updating the metadata 134 to indicate that the file management label has been affixed or otherwise associated with the data file. In some implementations, "tagging" a data file with a file management label may include writing label data directly into the stream 132.

FIG. 3B illustrates an exemplary dataflow scenario 350 in which a data file 130 is uploaded to a third-party hosted storage service 352. Then, the third-party hosted storage service 352 generates a query 354 as to whether characteristics of the data file 130 satisfy application criteria 106 corresponding to any particular file management labels. In some implementations, the query 354 includes an instance of the data file 130 to enable the content analysis service 102 to analyze the content and/or other characteristics of the data file 130. Response to the query 354, the content analysis service 102 may determine whether application criteria 106 of any particular file management label is satisfied by the data file 130. Then, the content analysis service 102 may transmit a verdict 144 to the third-party hosted storage service 352. In various implementations, the verdict 144 may include label data 104 that defines one or more of a name of a particular file management label that is applicable to the data file 130, the application criteria 106 of the particular file management label, and/or label rules 108 of the particular file management label. Based on the verdict 144, the third-party hosted storage service 352 may tag the data file 130 with the particular file management label. Accordingly, the next time the user 140 accesses the data file 130 from the third-party hosted storage service 352, a user 140 may be supplied with a tagged version of the data file 130(T).

In some implementations, the label data 104 defining the file management label(s) may be configured according to at least one standardized format to enable a plurality of different applications (e.g., application clients 118 and/or application services 204) and/or computing platforms (e.g., content analysis service 102, productivity Suite 202, and/or third-party hosted storage 352) to read the label data associated with any particular data file (e.g., from a stream of the data file) and/or write label data in association with any particular data file.

FIG. 4 illustrates an exemplary data flow scenario 400 in which multiple instances of a data file 130 that is "tagged" with a file management label 304 (referred to as a "tagged" data file 130(T)) are propagated through multiple computing resources (e.g., a client device 116 and at least one other computing resource 402) and within which these computing resources are transmitted label data updates 404 based on centralized updates to the file management label 304. As illustrated, a content analysis service 102 may transmit a verdict 144 to a client device 116 to cause a data file 130 to be tagged with a file management label 304 to generate a tagged file 130(T). For example, a content analysis cycle 146 (not shown in FIG. 4) may be performed between the client device 116 and the content analysis service 102 which results in the verdict 144. Additionally or alternatively, the tagging of the data file may result from techniques discussed with respect to any or all of FIGS. 2-3B.

As further illustrated, the "tagged" data file 130(T) may be transmitted from the client device 116 to the other computing resource 402 and, ultimately, may be placed into storage 404 at the other computing resource 402. In some implementations, the other computing resource 402 may be a second client device 116(1) that resides in a local data layer. For example, the other computing resource 402 may be any one of a smart phone, a laptop computer, a desktop computer, a tablet computer, a residential home server system, etc. In some implementations, the other computing resource 402 may be a web based storage resource such as, for example, the hosted storage service 302 of the productivity Suite 202 and/or the third-party hosted storage service 352. The label data 104 that is associated with the "tagged" data file 130(T) may cause the other computing resource 402 to generate propagation data 406 and transmit the propagation data 406 to the content analysis service 102. The propagation data 406 may include an identifier associated with the "tagged" data file 130(T), an indication of the particular file management label(s) that have been associated with the "tagged" data file 130(T), and address data associated with the other computing resource 402 and/or storage 404 thereof. In this way, as the "tagged" data file 130(T) is propagated from the client device 116 to the other computing resource 402, the content analysis service 102 receives propagation data 406 that enables the content analysis service 102 to keep track of where multiple instances of the "tagged" data file 130(T) reside. For example, because the verdict 144 was only transmitted to the client device 116, the content analysis service 102 initially only had visibility of the instance of the "tagged" data file 130(T) that resides on the client device 116. However, upon receipt of the propagation data 406, the content analysis service 102 now has visibility of both the instance of the "tagged" data file 130(T) that resides on the client device 116 and the instance of the "tagged" data file 130(T) that resides on the other computing resource 402.

Then, an administrator 408 may utilize a computing device 410 to submit label data updates 412 to the content analysis service 102. The label data updates 412 may update various aspects of the label data including, but not limited to, the application criteria 116 and/or the label rules 108. After receiving the label data updates 412, the content analysis service 102 may transmit the label data updates 412 to the multiple computing resources at which the multiple instances of the "tagged" data file 130(T) reside. As a more specific but nonlimiting example, with particular reference to FIG. 5B consider a scenario in which the label rules 108 associated with a "Tax Record" file management label are configured to cause the application 504 to display a graphical element 510 in the form of a "Tag" or "Label" that is affixed to the file name. Then, subsequent to the "tagged" data file 130(T) propagating to the other computing resource 402, the label data updates 412 may modify the label rules 108 associated with the "Tax Record" file management label to cause the application 504 to display the graphical element 510 in addition to another graphical element in the form of a watermark 556. Under these circumstances, upon receiving label data updates 412 generated by the administrator 408, the content analysis service 102 may push the label data updates 412 to each computing resource at which it is known that an instance of the "tagged" data file 130(T) resides. Then, the label data updates 412 received by each computing resource (e.g., the client device 116 and the other computing resource 402) may update the "tagged" data file 130(T) to reflect any changes made in the label data updates 412. Continuing with the previous example, upon receiving the label data updates 412, the label rules 108 associated with the "Tax Record" file management label may be updated at each computing resource to immediately cause the application 504 to display both graphical element 510 as well as the watermark 556.

In some implementations, the label rules 108 may include instructions associated with encrypting data files based on the data files being tagged with a particular file management label. For example, upon the client device 116 receiving the verdict 144, the application client 118 and/or labeling module 122 thereof may be deployed to immediately encrypt the data file 130 and/or the "tagged" version of the data file 130(T). Then, the label data updates 412 may modify the label rules 108 so that data files tagged with that particular file management label no longer need to be encrypted. Accordingly, when the label data updates 412 are pushed to the client device 116 and the other computing resource 402, each respective instance of the "tagged" data file 130(T) may be decrypted. It can be appreciated that an alternate scenario is also within the scope of the present disclosure, e.g., when the label data updates 412 cause the client device 116 and the other computing resource 402 to encrypt rather than decrypt respective instances of the "tagged" data file 130(T).

In some implementations, the label rules 108 may include instructions associated with whether data files that are tagged with a particular file management label are permitted to be shared outside of an organization. For example, upon the client device 116 receiving the verdict 144, the application client 118 and/or labeling module 122 thereof may be deployed to immediately tag and encrypt the data file 130, e.g., so that the "tagged" data file 130(T) is encrypted. Then, upon a user attempting to deploy an application client 118 to access the "tagged" data file 130(T), it may be determined whether user credentials associated with the application client correspond to the organization (or otherwise indicate that a user is permitted to access the "tagged" data file 130(T)). Thus, in the event that a data file propagates to one or more users that are outside of the organization and/or otherwise do not have authorization to access the data file, the techniques described herein prevent unauthorized access to the data file by preventing decryption of the data file.

Accordingly, it can be appreciated that the presently disclosed techniques enable file management labels and/or label data updates 412 that indicate updated definitions associated with the file management labels (e.g., updated definitions for application criteria 106 and/or label rules 108) to be published to client workloads such as, for example, client device operating systems (e.g., MICROSOFT WINDOWS, Mac OS X, iOS, etc.) and/or client applications. Furthermore, in accordance with the various implementations described herein, functionality of one or more web-based resources may be merged with functionality of one or more client devices so that various aspects of the labeling process and/or label enforcement process may be performed by the one or more web-based resources, whereas various other aspects of the labeling process and/or label enforcement process are to be performed by the one or more client devices.

FIG. 5A illustrates aspects of a graphical user interface (GUI) 500 that includes a notification 502 that suggests to a user that a particular file management label is applicable to a data file that is currently open within an application 504. The GUI 500 corresponds to an implementation in which the application 504 is a word processing-type application such as, for example, MICROSOFT WORD (online or desktop version), GOOGLE DOCS, etc. It can be appreciated however that the illustrated implementation is for illustrative purposes only and that aspects of the GUI 500 can be incorporated into any other suitable type of application.

In some implementations, the notification 502 may indicate that an analysis of the currently open data file (e.g., data file A 506 in the illustrated implementation) against application criteria of a particular file management label (e.g., a "Tax Record" file management label in the illustrated implementation) has been performed. The notification 502 may further indicate that based on the analysis, one or more characteristics of the currently open data file satisfy the application criteria of the particular file management label. For example, in the specific but nonlimiting illustrated scenario, the notification 502 indicates to the user that "Based on an analysis of [the data file that is open in the current session] it appears that tagging this file with [a particular file management label] is appropriate."

In some implementations, the notification 502 may prompt the user 140 to provide instructions as to whether to apply the particular file management label to the data file that is open in the current session. For example, in the specific but nonlimiting illustrated scenario, the notification 502 inquires as to whether the user would like to tag the currently open data file. As further illustrated, the notification 502 may include one or more user interface (UI) elements to enable the user 140 to make a selection as to whether or not to apply the tag. In particular, the notification 502 includes a first UI element 51 4(1) that is selectable to cause a labeling module 122 to tag the currently open data file with the suggested file management label and a second UI element 514(2) that is selectable to cause the labeling module 122 to refrain from tagging the currently open data file with the suggested file management label. In some implementations, the notification 502 may include a UI element to enable the user to obtain additional information associated with the suggested file management label. For example, in the illustrated scenario, the notification 502 includes a third UI element 514(3) that is selectable by the user to cause the GUI 500 to display the application criteria 106 of the suggested file management label.

In some implementations, the GUI 500 may include one or more graphical elements 510 to communicate aspects of a file management label that has been associated with a data file that is currently open within the application 504. In the illustrated example, a "Tax Record" file management label data has been associated with data file A 506 which is currently open within the application 504. In this example, the graphical element 510 is illustrated near the top of the GUI 500 in the form of a "Tag" or "Label" that is affixed to the file name. In particular, the GUI 500 includes a graphical representation of a physical merchandise tag adjacent to the name of the currently open data file. It can be appreciated that the graphical element 510 may appear upon a user selecting the first UI element 514(1).

In some implementations, the GUI 500 may include a ribbon that exposes one or more user interface (UI) elements 512 that enable a user to deploy one or more functionalities of the labeling module 122. As used herein, the term "ribbon" is used in the context of computer interface design and may generally refer to a graphical control element in the form of a set of toolbars placed on several tabs. Exemplary tabs include, but are not limited to, a "HOME" tab, an "INSERT" tab, a "DESIGN" tab, a "LAYOUT" tab, a "LABEL" tab, a "REVIEW" tab, and/or a "VIEW" tab. In the illustrated example, the ribbon is illustrated with the "LABEL" tab selected to expose the one or more UI elements 512 associated with the labeling module 122.

In some embodiments, the GUI 500 may include a UI element 512(1) that enables a user to apply a file management label to a data file that is currently open within the application 504. In some embodiments, the GUI 500 may include a UI element 512(2) that enables a user to change a file management label that has been applied to the currently open data file. For example, the user may open the data file 506 and discover that it has been labeled as a tax record (e.g., upon seeing the graphical element 510) but may determine that the data file 506 is not actually a tax record. Under these circumstances, the user may select the UI element 512(2) to remove the association between the currently open data file 506 and the "Tax Record" file management label and/or apply a different file management label to the currently open data file. In some embodiments, the GUI 500 may include a UI element 512(3) that enables a user to view properties associated with one or more file management labels. For example, upon selection of the UI element 512(3), various aspects of the label data 104 may be graphically exposed to the user. As a more specific but nonlimiting example, the user may click on the UI element 512(3) and then select an icon associated with the "Tax Record" file management label to expose a graphical interface element that graphically displays application criteria 106 and/or label rules 108 associated with any particular selected file management label. In some embodiments, the GUI 500 may include a UI element 512(4) that enables a user to turn on or off label enforcement functionality with respect to a currently open data file. For example, upon selection of the UI element 512(4) a user may be enabled to save into the label data 104 instructions for the label enforcer 126. Exemplary instructions include, but are not limited to, instructions that cause the label enforcer 126 to strictly enforce the label rules 108, instructions that cause the label enforcer 126 to inform a user of the label rules 108 as they become applicable (e.g., when a user uses the application 504 to access a data file that should have been deleted the label enforcer 126 may expose a notification to the user that suggests deletion of the file), and/or instructions that cause the label enforcer 126 not to enforce one or more label rules 108 with respect to one or more individual datafiles.

In some implementations, a user 140 may utilize UI element 512(1) to apply a file management label to the data file and/or utilize UI element 512(2) to change the file management label on a data file. Utilizing either of these may represent a trigger event that initiates the transmission of modification data 140 and/or a current version of the data file 130 to the content analysis service 102 to verify the labeling action taken by the user 140. Accordingly, it can be appreciated that the content analysis service 102 may be deployed automatically upon a user adding and/or changing label data associated with a particular data file to ensure that the user's actions conform with application criteria of any file management label applied by the user. Furthermore, in the event that a user applies a first file management label to a particular data file and the content analysis service 102 determines that characteristics of the particular data file satisfy application criteria of a second file management label but not the first file management label, a notification 502 may be tailored to suggest that the user update label data accordingly.

FIG. 5B illustrates aspects of a GUI 550 that includes a notification 552 that informs a user 140 that additions and/or modifications to a data file A 506 that is currently open within an application 504 have resulted in an automatic application of a particular file management label. As illustrated, the notification 552 may indicate that an analysis of one or more recent additions and/or modifications of the currently open data file (e.g., data file A 506 in the illustrated implementation) have resulted in the currently open data file satisfying application criteria 106 corresponding to a particular file management label. In some implementations, the notification 552 may include a UI element 554 to enable the user to obtain additional information associated with the notification 552. For example, upon selecting the UI element 554 the user may be presented with an analysis summary that indicates which specific aspects of the currently open data file match which specific application criteria of the particular file management label.

In some implementations, the notification 552 may indicate which particular file management labels have been applied to the currently open data file. For example, in the illustrated scenario, the notification 552 informs the user that the currently open data file has been associated with a "Tax Record" file management label and has been tagged with a "Tax Record" graphical element 510 and/or watermarked with a watermark 556 accordingly.

In some implementations, a particular file management label may be applied to a particular data file without the user being notified (e.g., the label application may happen as a background process without interrupting the user). As a specific but nonlimiting example, upon the user 140 typing an organization's EIN into an individual data file (e.g., via the application client 118 and/or the application service 204), the labeling module 122 may automatically write label data 104 corresponding to a "Tax Record" file management label into one or both of the stream 132 and/or the metadata 134 without immediately or even ever notifying the user. In some implementations, a user may periodically receive a report that indicates various tasks performed by the labeling module 122 within a particular period of time. For example, the user 140 may receive a weekly email that details associations made that week by the labeling module 122 between file management labels and individual datafiles which the user 140 has worked on that week. It can be appreciated that such an implementation may be beneficial in that it may give the user 140 visibility as to how his or her work products are being automatically labeled without disrupting his or her workflow each time a labeling operation takes place.

FIG. 6 illustrates a flow diagram in association with an example process 600 which is described with reference to FIGS. 1-5B. The process 600 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform or implement particular functions. The order in which operations are described is not intended to be construed as a limitation, and any number of the described blocks can be combined in any order and/or in parallel to implement the process. Other processes described throughout this disclosure shall be interpreted accordingly.

Turning now to FIG. 6, a flow diagram illustrates an example process 600 of providing modification data that is generated during a content editing session to a content analysis service and receiving back from the content analysis service a verdict indicating whether a current state of the data file satisfies application criteria of a file management label.

At block 601, a system may deploy an application to facilitate a content editing session in association with a data file. For example, a user may select the data file and cause an application client that is running locally on a client device to open the data file to enable the user to view the content of the data file and generate one or more modifications to the content of the data file such as, for example, adding content to the data file, deleting content from the data file, and/or modifying existing content within the data file.

At block 603, the system may generate modification data during the content editing session. Exemplary modification data indicates the one or more modifications generated by the user. For example, if the user adds a new paragraph of content at the end of the data file's existing content, the modification data may include the new paragraph as well as an indication as to where the new paragraph belongs in relation to the existing content of the data file.

At block 605, the system may provide the modification data to a content analysis service during the content editing session. In some implementations, system provides the modification data to the content analysis service in real time while the user interacts with the application to modify the content of the data file. For example, the system may provide the content analysis service with sequential instances of the modification data at predetermined intervals of time (e.g., every 20 seconds, one minute, five minutes, etc.). Additionally and/or alternatively, the system may provide the content analysis service with sequential instances of the modification data in response to one or more trigger events (e.g., each time the user saves, each keystroke entered by the user, etc.). Upon receipt of the modification data, the content analysis service may determine a current state of the data file and, ultimately, analyze the current state of the data file with respect to application criteria for one or more file management labels. The application criteria may indicate characteristics of data files that result in one or more file management labels being applicable thereto.

In some embodiments, application criteria may indicate one or more sensitive content types based on predefined patterns that can be identified based on a regular expression (REGEX) and/or function. For example, application criteria may include an indication of a REGEX to cause the system to parse the content of the data file to identify one or more numbers strings and, ultimately, to analyze the one or more numbers strings to determine whether sensitive information (e.g., tax identification numbers, credit card numbers, etc.) are included within the content of the data file. As another example, application criteria may define a search query to be performed by the system against the content of the data file to cause the file management label to be associated with individual data files that contain at least one of a predefined set of terms. As a more specific but nonlimiting example, application criteria may define a search query to cause files that contain at least one of the terms "Tax*" or "Form 1099*" to be designated as tax records and, therefore, automatically labeled with a "Tax Record" file management label. Although any suitable search query language may be deployed to define application criteria, exemplary search query languages include the Keyword Query Language (KQL) and the FAST Query Language (FQL) which are included in MICROSOFT SHAREPOINT.

At block 607, the system may receive a verdict that indicates that the current state of the data file satisfies application criteria corresponding to a file management label. The verdict may be received by the application being used to edit the content of the data file during the content editing session, e.g., the application may receive the verdict while a user is actively editing content of the data file. Thus, the modification data may be generated and provided to the content analysis service in real-time during the content editing session and, furthermore, that the content analysis service quickly analyzes the modification data to determine whether the current state of the data file satisfies the application criteria. It can be appreciated therefore that the content analysis cycle described herein (e.g., that includes generating and providing modification data and also receiving the verdict) may be performed in near real time so that a modification that causes a particular file management label to apply to a data file (e.g., a user types in the term "FORM 1099") may result in the particular file management label being applied to the data file almost immediately.

At block 609, the system may respond to receiving the verdict by performing a predetermined action in association with the data file during the content analysis the session. For example, as described herein the system may cause one or more notifications to be shown in association with the data file responsive to receiving the verdict. In some instances, the notification may prompt the user to indicate whether to associate the file management label with the data file (e.g., whether to tag the data file with the file management label). As another example, the system may automatically tag the data file with the file management label by writing label data into a stream of the data file and/or metadata of the data file.

It should be appreciated that the above-described subject matter may be implemented as a computer-controlled apparatus, a computer process, a computing system, or as an article of manufacture such as a computer-readable storage medium. Among many other benefits, the techniques herein improve efficiencies with respect to a wide range of computing resources. For instance, net processing cycles on a system implementing the techniques described herein are drastically reduced over the system deploying conventional records management techniques for at least the reason that newly created instances of a data file defined by a stream with embedded label data do not need to be re-analyzed to determine any applicable file management labels. In contrast, because conventional records management techniques rely on external data objects (e.g., databases that are external to streams defining data files) to define associations between data files and file management labels, newly created instances of data files generally lose any predefined associations with file management labels and therefore either lack valuable records management data or must be reanalyzed to re-determine the records management data. Other technical effects other than those mentioned herein can also be realized from implementations of the technologies disclosed herein.

FIG. 7 shows additional details of an example computer architecture for a computer capable of executing the functionalities described herein such as, for example, those described with reference to the content analysis service 102, the application client 118 and/or application service 204, or any program components thereof as described herein. Thus, the computer architecture 700 illustrated in FIG. 7 illustrates an architecture for a server computer, or network of server computers, or any other types of computing devices suitable for implementing the functionality described herein. The computer architecture 700 may be utilized to execute any aspects of the software components presented herein.

The computer architecture 700 illustrated in FIG. 7 includes a central processing unit 702 ("CPU"), a system memory 704, including a random-access memory 706 ("RAM") and a read-only memory ("ROM") 708, and a system bus 710 that couples the memory 704 to the CPU 702. A basic input/output system containing the basic routines that help to transfer information between elements within the computer architecture 700, such as during startup, is stored in the ROM 708. The computer architecture 700 further includes a mass storage device 712 for storing an operating system 714, other data, and one or more application programs. The mass storage device 712 may further include one or more of the content analysis service 102, the analysis engine 112, the application service 204, the application client 118, the labeling module 122, and/or the label enforcer 126.

The mass storage device 712 is connected to the CPU 702 through a mass storage controller (not shown) connected to the bus 710. The mass storage device 712 and its associated computer-readable media provide non-volatile storage for the computer architecture 700. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes of the claims, the phrase "computer storage medium," "computer-readable storage medium" and variations thereof, does not include waves, signals, and/or other transitory and/or intangible communication media, per se.

According to various techniques, the computer architecture 700 may operate in a networked environment using logical connections to remote computers through a network 750 and/or another network (not shown). The computer architecture 700 may connect to the network 750 through a network interface unit 716 connected to the bus 710. It should be appreciated that the network interface unit 716 also may be utilized to connect to other types of networks and remote computer systems. The computer architecture 700 also may include an input/output controller 718 for receiving and processing input from a number of other devices, including a keyboard, mouse, or electronic stylus (not shown in FIG. 7). Similarly, the input/output controller 718 may provide output to a display screen, a printer, or other type of output device (also not shown in FIG. 7). It should also be appreciated that via a connection to the network 750 through a network interface unit 716, the computing architecture may enable the content analysis service 102, the productivity suite 202, the third party hosted storage service 352, and/or client device 116 to communicate with one another.

It should be appreciated that the software components described herein may, when loaded into the CPU 702 and executed, transform the CPU 702 and the overall computer architecture 700 from a general-purpose computing system into a special-purpose computing system customized to facilitate the functionality presented herein. The CPU 702 may be constructed from any number of transistors or other discrete circuit elements, which may individually or collectively assume any number of states. More specifically, the CPU 702 may operate as a finite-state machine, in response to executable instructions contained within the software modules disclosed herein. These computer-executable instructions may transform the CPU 702 by specifying how the CPU 702 transitions between states, thereby transforming the transistors or other discrete hardware elements constituting the CPU 702.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 may include other types of computing devices, including hand-held computers, embedded computer systems, personal digital assistants, and other types of computing devices known to those skilled in the art. It is also contemplated that the computer architecture 700 may not include all of the components shown in FIG. 7, may include other components that are not explicitly shown in FIG. 7, or may utilize an architecture completely different than that shown in FIG. 7.

EXAMPLE CLAUSES

The disclosure presented herein may be considered in view of the following clauses.

Example Clause A, a computer-implemented method, comprising: deploying an application to facilitate a session during which a user is enabled to modify content of a data file; generating, during the session, modification data that indicates one or more modifications made by the user to the content of the data file; providing the modification data to a content analysis service; receiving, from the content analysis service during the session, a verdict indicating that a current state of the data file satisfies application criteria corresponding to a file management label; and associating label data with the data file in response to receiving the verdict, wherein the label data that defines at least one of a label name corresponding to the file management label, the application criteria of the file management label, or label rules corresponding to the file management label.

Example Clause B, the computer-implemented method of Example Clause A, wherein the verdict causes the application to display a notification that indicates that the one or more modifications have caused the current state of the data file to satisfy the application criteria, and wherein the notification prompts the user to indicate whether to apply the file management label to the data file.

Example Clause C, the computer-implemented method of any one of Example Clauses A through B, wherein the verdict causes the application to automatically apply the file management label to the data file during the session by writing label data, corresponding to the file management label, into at least one of: a Stream that corresponds to the data file, or metadata that corresponds to the data file.

Example Clause D, the computer-implemented method of Example Clause C, wherein the verdict further causes the application to display a notification that indicates that the one or more modifications have resulted in the file management label being automatically applied to the data file.

Example Clause E, the computer-implemented method of any one of Example Clauses A through D, wherein the modification data is provided to the content analysis service during the session to indicate the one or more modifications in real-time while the user interacts with the application to modify the content of the data file.

Example Clause F, the computer-implemented method of any one of Example Clauses A through E, wherein sequential instances of the modification data are transmitted to the content analysis service at predetermined intervals of time.

Example Clause G, the computer-implemented method of any one of Example Clauses A through F, wherein sequential instances of the modification data are transmitted to the content analysis service in response to one or more trigger events.

Example Clause H, the computer-implemented method of any one of Example Clauses A through G, wherein the providing the modification data to the content analysis service and the receiving the verdict from the content analysis service correspond to a content analysis cycle during which sequential instances of the modification data are generated, by a client device, at a local data layer and transmitted to the content analysis service at a web services layer.

Example Clause I, a system, comprising: at least one processor; and at least one memory in communication with the at least one processor, the at least one memory having computer-readable instructions stored thereupon that, when executed by the at least one processor, cause the at least one processor to: deploy an application to facilitate a session during which a user is enabled to modify content of a data file; cause the application to communicate, during the session, with a content analysis service to perform a content analysis cycle that includes: generating, during the session, sequential instances of modification data indicating modifications made by the user to the content of the data file, periodically providing the sequential instances of the modification data to the content analysis service, and receiving, from the content analysis service during the session, a verdict indicating that a current state of the data file satisfies application criteria corresponding to a file management label; and cause a client device to display a notification responsive to the receiving the verdict, wherein the notification indicates at least one of the application criteria corresponding to the file management label or one or more actions corresponding to the file management label.

Example Clause J, the system of Example Clause I, wherein the computer-readable instructions further cause the system to transmit, to the content analysis service, an instance of the data file that defines an initial state of the data file, wherein the modification data indicates additions applied by the user to the initial state of the data file.

Example Clause K, the system of any one of Example Clauses I through J, wherein the notification prompts the user to indicate whether to apply the file management label to the data file.

Example Clause L, the system of any one of Example Clauses I through K, wherein the application is an application client that is run locally at the client device, and wherein the content analysis service receives the sequential instances of the modification data from the client device during the session.

Example Clause M, the system of any one of Example Clauses I through L, wherein the computer-readable instructions further cause the system to generate versioning data that maintains a record of the current state while indicating one or more modifications that occur subsequent to the file management label being applied to the data file.

Example Clause N, the system of any one of Example Clauses I through M, wherein the sequential instances of the modification data are transmitted to the content analysis service based on at least one of: predetermined intervals of time, or one or more trigger events.

Example Clause O, the system of any one of Example Clauses I through N, wherein the verdict causes the application to automatically apply the file management label to the data file during the session by writing label data into a Stream that corresponds to the data file.

Example Clause P, the system of any one of Example Clauses I through O, wherein the verdict causes the application to automatically apply the file management label to the data file during the session by writing label data into metadata that corresponds to the data file.

Example Clause Q, a client device, comprising: an application client; one or more processors; and at least one memory in communication with the at least one processor, the at least one memory having computer-readable instructions stored thereupon that, when executed by the at least one processor, cause the client device to: deploy the application client to facilitate a session for enabling a user to modify content of a data file; cause the application client to transmit modification data to a content analysis service, wherein the modification data indicates one or more modifications made during the session to the content of the data file; receive, from the content analysis service during the session, a verdict indicating that a current state of the data file satisfies application criteria corresponding to a file management label; and in response to the verdict, display a notification to the user during the session, wherein the notification that indicates the application criteria corresponding to the file management label.

Example Clause R, wherein the computer-readable instructions further cause the client device to transmit, prior to transmitting the modification data, an instance of the data file to the content analysis service, wherein the instance of the data file defines an initial state from which the one or more modifications are made during the session.

Example Clause S, wherein the modification data is transmitted by the application client to the content analysis service in real-time as the user enters the one or more modifications during the session.

Example Clause T, wherein the notification includes at least one user interface element that enables the user to instruct the application client whether write label data into at least one of a Stream of the data file or metadata of the data file.

CONCLUSION

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented method, comprising:
   facilitating, by an application, a content editing session during which content of a data file is modified based on input data that is generated via an input device;
   generating, by the application during the content editing session, sequential instances of modification data that correspond to modifications, to the content of the data file, that are applied based on the input data;
   providing, by the application during the content editing session, the sequential instances of modification data to a content analysis service that is configured to analyze the sequential instances of modification data based on application criteria corresponding to a file management label, wherein the sequential instances of the modification data are provided to the content analysis service based on:
     a predetermined time interval, or
     the input data causing a predetermined number of the modifications;
   receiving, by the application from the content analysis service, a verdict indicating that a current state of the data file during the content editing session satisfies the application criteria corresponding to the file management label; and
   associating, by the application in response to receiving the verdict from the content analysis service, the data file with label data that includes:
     a label name corresponding to the file management label,
     the application criteria of the file management label, or
     label rules corresponding to the file management label.

2. The computer-implemented method of claim 1, wherein the verdict causes the application to display, during the content editing session, a notification that:
   indicates that the modifications have caused the current state of the data file to satisfy the application criteria, and
   prompts for an indication of whether to apply the file management label to the data file.

3. The computer-implemented method of claim 1, wherein the verdict causes the application to automatically apply the file management label to the data file during the content editing session by writing the label data, corresponding to the file management label, into at least one of: a Stream that corresponds to the data file, or metadata that corresponds to the data file.

4. The computer-implemented method of claim 3, wherein the verdict further causes the application to trigger display of a notification, during the content editing session, that indicates that the modifications have resulted in the file management label being automatically applied to the data file.

5. The computer-implemented method of claim 1, wherein the modification data is provided, by the application to the content analysis service during the content editing session, to indicate the modifications to the content analysis service in substantially real-time while the application modifies the content of the data file based on the input data.

6. The computer-implemented method of claim 1, wherein the sequential instances of the modification data are transmitted to the content analysis service in accordance with the predetermined time interval.

7. The computer-implemented method of claim 1, wherein the sequential instances of the modification data are transmitted to the content analysis service in response to the input data causing the predetermined number of the modifications.

8. The computer-implemented method of claim 1, wherein the providing the modification data to the content analysis service and the receiving the verdict from the content analysis service correspond to a content analysis cycle during which the sequential instances of the modification data are generated, by a client device, at a local data layer and periodically transmitted to the content analysis service at a web services layer.

9. A system, comprising:
   at least one processor; and
   at least one memory in communication with the at least one processor, the at least one memory having computer-readable instructions stored thereupon that, when executed by the at least one processor, cause the at least one processor to:
     facilitate, by an application, a content editing session during which content of a data file is modified based on input data that is generated via an input device of a client device;
     cause the application to communicate, during the content editing session, with a content analysis service to support a content analysis cycle that includes:
       generating, by the application during the content editing session, sequential instances of modification data that correspond to modifications, to the content of the data file, that are applied based on the input data,
       periodically providing, by the application to the content analysis service during the content editing session, the sequential instances of the modification data in response to the input data causing a predetermined number of modifications, wherein the content analysis service is configured to analyze the sequential instances of the modification data during the content editing session based on application criteria of a file management label, and
       receiving, by the application from the content analysis service during the content editing session, a verdict indicating that a current state of the data file satisfies the application criteria corresponding to the file management label; and
     in response to the verdict being received by the application, cause an output device of the client device to display a notification indicating:
       the application criteria corresponding to the file management label, or
       one or more actions corresponding to the file management label.

10. The system of claim 9, wherein the computer-readable instructions further cause the system to transmit, to the content analysis service, an instance of the data file that defines an initial state of the data file, wherein the modification data indicates additions that are applied to the initial state of the data file responsive to the input data.

11. The system of claim 9, wherein the notification prompts for an indication of whether to apply the file management label to the data file.

12. The system of claim 9, wherein the application is an application client that is executed by an operating system of the client device, and wherein the content analysis service receives the sequential instances of the modification data from the client device during the content editing session session.

13. The system of claim 9, wherein the computer-readable instructions further cause the system to generate versioning data that maintains a record of the current state while indicating one or more modifications that occur subsequent to the file management label being applied to the data file.

14. The system of claim 9, wherein the predetermined number of modifications corresponds to a predetermined number of keystrokes at the input device.

15. The system of claim 9, wherein the verdict causes the application to automatically apply the file management label to the data file during the content editing session by writing label data into a Stream that corresponds to the data file.

16. The system of claim 9, wherein the verdict causes the application to automatically apply the file management label to the data file during the content editing session by writing label data into metadata that corresponds to the data file.

17. A client device, comprising:
an application client;
at least one processor; and
at least one memory in communication with the at least one processor, the at least one memory having computer-readable instructions stored thereupon that, when executed by the at least one processor, cause the client device to:
cause the application client to facilitate a content editing session during which content of a data file is modified based on input data;
cause the application client to transmit, to a content analysis service, modification data that indicates modifications that are applied to the content of the data file, wherein the content analysis service is configured to analyze application criteria of a file management label with respect to sequential instances of the modification data that are transmitted to the content analysis service periodically, throughout the content editing session, in response to the input data causing a predetermined number of the modifications;
receive, from the content analysis service during the content editing session, a verdict indicating that a current state of the data file satisfies the application criteria of the file management label; and
in response to the verdict, cause an output device of the client device to display a notification during the content editing session, wherein the notification indicates the application criteria corresponding to the file management label.

18. The client device of claim 17, wherein the computer-readable instructions further cause the client device to transmit, prior to transmitting the modification data, an instance of the data file to the content analysis service, wherein the instance of the data file defines an initial state from which the modifications are made during the content editing session.

19. The client device of claim 17, wherein the modification data is transmitted by the application client to the content analysis service in real-time as the modifications occur during the content editing session.

20. The client device of claim 17, wherein the notification includes at least one user interface element that is selectable to instruct the application client whether to associate label data with the data file.

* * * * *